United States Patent
Zhang

(10) Patent No.: US 8,411,534 B2
(45) Date of Patent: Apr. 2, 2013

(54) DATA STORAGE DEVICE, DATA STORAGE APPARATUS, AND METHODS FOR STORING AND READING DATAS

(75) Inventor: Yuanfeng Zhang, Beijing (CN)

(73) Assignee: Beijing BOE Optoelectronics Technology Co., Ltd., Beijing (CN)

( * ) Notice: Subject to any disclaimer, the term of this patent is extended or adjusted under 35 U.S.C. 154(b) by 543 days.

(21) Appl. No.: 12/718,352

(22) Filed: Mar. 5, 2010

(65) Prior Publication Data
US 2010/0226217 A1 Sep. 9, 2010

(30) Foreign Application Priority Data
Mar. 5, 2009 (CN) .......................... 2009 1 0079263

(51) Int. Cl.
*G11B 11/00* (2006.01)
(52) U.S. Cl. ................. 369/13.14; 369/112.27
(58) Field of Classification Search ............... 369/13.01, 369/13.14, 13.25, 13.26, 13.28, 112.27, 94, 369/116, 121, 284, 44.37; 360/39
See application file for complete search history.

(56) References Cited

U.S. PATENT DOCUMENTS 7,408,729 B2 * 8/2008 Brooks et al. ................... 360/39
2008/0212436 A1 9/2008 Zijp et al.

FOREIGN PATENT DOCUMENTS

| CN | 101218638 A | 7/2008 |
| JP | 2008-016096 A | 1/2008 |
| WO | 2008/072156 A2 | 6/2008 |

* cited by examiner

*Primary Examiner* — Ali Neyzari
(74) *Attorney, Agent, or Firm* — Ladas & Parry LLP

(57) ABSTRACT

A data storage device comprises: a light waveguide element; a protective element; and a plurality of data storage elements interposed between the light waveguide element and the protective element. The light waveguide element irradiates light at a critical angle or more on the data storage elements. Each of the data storage elements comprises a transparent ferromagnetic element, which has been magnetized, disposed therein, and the magnetized transparent ferromagnetic element is movable by a magnetic field. When the magnetized transparent ferromagnetic element is moved close to the light waveguide element to allow light from the light guiding element to pass the data storage element, a first data is recorded, and when the magnetized transparent ferromagnetic element is moved away from the light waveguide element to prohibit light from the light guiding element to pass the data storage element, a second data is recorded.

19 Claims, 3 Drawing Sheets

DATA STORAGE DEVICE, DATA STORAGE APPARATUS, AND METHODS FOR STORING AND READING DATAS

BACKGROUND

The present invention relates to a data storage device, a data storage apparatus, and methods for writing and reading data.

With development in information storage technique, various storage devices are proposed. Especially, optical storage device is widely used because it has the merits of fast rate, small volume, long lifetime, and the like. The existing optical storage device generally has a disc form and information carried on the optical disc is converted into digits "0" and "1" corresponding to pits and lands on the optical disc, respectively. Pits having different lengths and lands between pits form spiral tracks extending from the inner side to the outer side of a disc, thereby recording data.

Pits and lands may be formed on an optical disc to record data in two ways, i.e., by laser ablation or laser irradiation, corresponding to write-only-read-many (WORM) disc and rewritable disc, respectively. In the way of laser ablation, a line-polarized collimated laser beam having a predetermined wavelength is modulated according to information to be recorded so as to obtain a series of laser pulses containing the information to be recorded. The laser pulses are focused by a optical system to form a well-focused light spot, which is used to ablate a recording layer containing dye so as to form pits, and lands are formed by portions of the optical disc that are not ablated. Thus, information is recorded into the optical disc. In the way of laser irradiation, phase change material is adopted for the recording layer of the optical disc such that the disc may be rewritable by changing phase state of the phase change material. In writing, intensity of the irradiated laser is set at its maximum to quickly heat the phase change material in a writing area to above the melting temperature. Then, the laser irradiation is stopped and the melted phase change material is cooled and forms an amorphous state. In erasing, a laser beam having a middling intensity is irradiated on the area of an amorphous state for relatively long time and the intensity is set lower when the temperature in the area rises beyond the melting point. Thus, the area is annealed to return to a crystal state.

However, the above technologies have shortcomings. As to the laser ablation method, the optical storage device can not be rewritten. As to the laser irradiation, the optical storage device may be rewritten only limited times. When the phase change material transforms between crystal and amorphous states limited times, the lattice geometry is gradually degraded to some extent, thereby rewritability of the device and reliability of information recording and reproducing degrade gradually.

SUMMARY

According to an embodiment of the present invention, a data storage device comprises: a light waveguide element; a protective element; and a plurality of data storage elements interposed between the light waveguide element and the protective element. The light waveguide element irradiates light at a critical angle or more on the data storage elements. Each of the data storage elements comprises a transparent ferromagnetic element, which has been magnetized, disposed therein, and the magnetized transparent ferromagnetic element is movable by a magnetic field. When the magnetized transparent ferromagnetic element is moved close to the light waveguide element to allow light from the light guiding element to pass the data storage element, a first data is recorded, and when the magnetized transparent ferromagnetic element is moved away from the light waveguide element to prohibit light from the light guiding element to pass the data storage element, a second data is recorded.

According to another embodiment of the present invention, a data storage apparatus comprises: a data storage device, comprising: a light waveguide element; a protective element; and a plurality of data storage elements interposed between the light waveguide element and the protective element, wherein the light waveguide element irradiates light at a critical angle or more on the data storage elements, wherein each of the data storage elements comprises a transparent ferromagnetic element, which has been magnetized, disposed therein, and the magnetized transparent ferromagnetic element is movable by a magnetic field, and wherein when the magnetized transparent ferromagnetic element is moved close to the light waveguide element to allow light from the light guiding element to pass the data storage element, a first data is recorded, and when the magnetized transparent ferromagnetic element is moved away from the light waveguide element to prohibit light from the light guiding element to pass the data storage element, a second data is recorded; a light-emitting device emitting light towards the light waveguide element; a light sensor reading the first data or the second data stored in the data storage device by detecting light transmitted through the data storage element; and a magnetic writer applying the magnetic field to move the magnetized transparent ferromagnetic element to approach the light waveguide element to record the first data or get away from the light waveguide element to record the second data.

According to yet another embodiment of the present invention, a method for writing data comprises: applying a magnetic field to adjust a distance between a light waveguide element and a magnetized transparent ferromagnetic element in a data storage element such that total internal reflection or frustrated total internal reflection occurs in the data storage element for light transmitted from the light waveguide element, wherein the light waveguide element irradiate light at a critical angle or more on the data storage elements, wherein when frustrated total internal reflection occurs and the light is transmitted through the magnetized transparent ferromagnetic element, a first data is written in the data storage element, and wherein when total internal reflection occurs and the light is prohibited from being transmitted through the magnetized transparent ferromagnetic element, a second data is written in the data storage element.

According to still another embodiment of the present invention, a method for reading data comprises: irradiating light at a critical angle or more on a data storage element via a light waveguide element from a light source, wherein the data storage element comprises a transparent ferromagnetic element, which has been magnetized, disposed therein, wherein the magnetized transparent ferromagnetic element is positioned to allow frustrated total internal reflection or total internal reflection to occur in the data storage element for light from the light waveguide element, wherein when frustrated total internal reflection occurs in the data storage element and light from the light source is transmitted through a magnetized transparent ferromagnetic element and detected, a first data is read from the data storage element, and wherein when total internal reflection occurs in the data storage element and light is prohibited from the light source being transmitted through a magnetized transparent ferromagnetic element and detected, a second data is read from the data storage element.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE EMBODIMENTS

Figure 1:
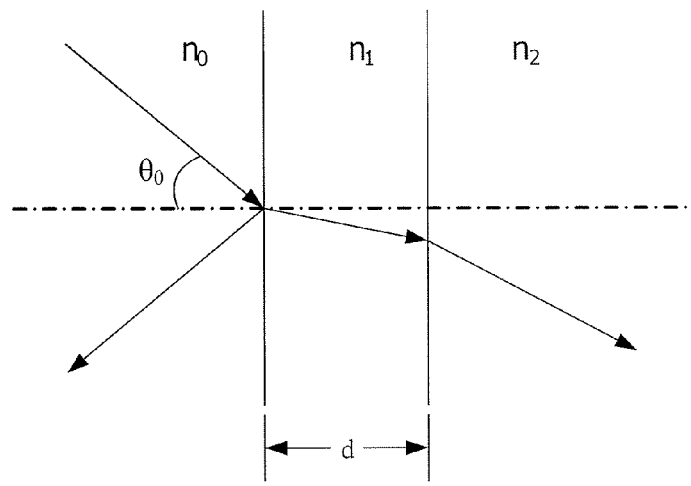
FIG. 1 is a schematic view showing principle of frustrated total internal reflection.

The embodiments of the invention now will be described more fully hereinafter with reference to the accompanying drawings.

The data storage device of an embodiment of the present invention may comprise a light waveguide element, a protective element, and a plurality of data storage elements interposed between the light waveguide element and the protective element. A transparent ferromagnetic element, which has been magnetized, is disposed in each of the data storage elements. When the transparent ferromagnetic element approaches the light waveguide element under an externally applied magnetic field allowing light from the light guiding element to go through, a first data is written to the data storage element; when the transparent ferromagnetic element gets away from the light waveguide element under an externally applied magnetic field forbidding light from the light guiding element to go through, a second data is written to the data storage element. The recorded data in a data storage element can be read by irradiating light from the light waveguide element towards the data storage element and the protective element and detecting whether the light is transmitted through the data storage element.

To be specific, the first data and the second data, i.e., the binary digits "0" and "1", can be written into the data storage device. The magnetized transparent ferromagnetic element may be obtained by applying a magnetic field to a normal transparent ferromagnetic element such that one end of the transparent ferromagnetic element acts as a positive magnetic pole and the other end thereof acts as a negative magnetic pole. In this case, the distance between the transparent ferromagnetic element that has been magnetized and the light waveguide element can be changed by an external magnetic field. In each data storage element, the distance between the magnetized transparent ferromagnetic element and the light waveguide element can be controlled by adjusting intensity of the external magnetic field so as to ensure that all of the magnetized transparent ferromagnetic elements representing a binary digit "0" are spaced apart from the light waveguide element by a same distance and that all of the magnetized transparent ferromagnetic elements representing a binary digit "1" are also spaced apart from the light waveguide element by a same distance. The examples of the material for producing the transparent ferromagnetic elements include $Pb_{1-x}La_x(Zr_yTi_{1-y})O$ (0<x<1, 0<y<1)(PLZT) $K_{1-x}LiNbO3$ (0<x<1)(KLN) and the like.

The data storage device of the embodiment records data according to the distance between the magnetized transparent ferromagnetic element and the light waveguide element. Specifically, data "0" (or "1") is recorded when the magnetized transparent ferromagnetic element is close to the light waveguide element in the data storage element, while data "1" (or "0") is recorded when the magnetized transparent ferromagnetic element is far away from the light waveguide element. In order to write data to the data storage device, the polarity of the magnetic field relative to the respective data storage elements can be controlled according to the data to be recorded so as to control position of the magnetized transparent ferromagnetic element in the data storage element and thus the distance between the magnetized transparent ferromagnetic element and the light waveguide element, thereby completing the writing process. In addition, the protective element may improve reliability of writing data to and reading data from the data storage element.

Figure 2:
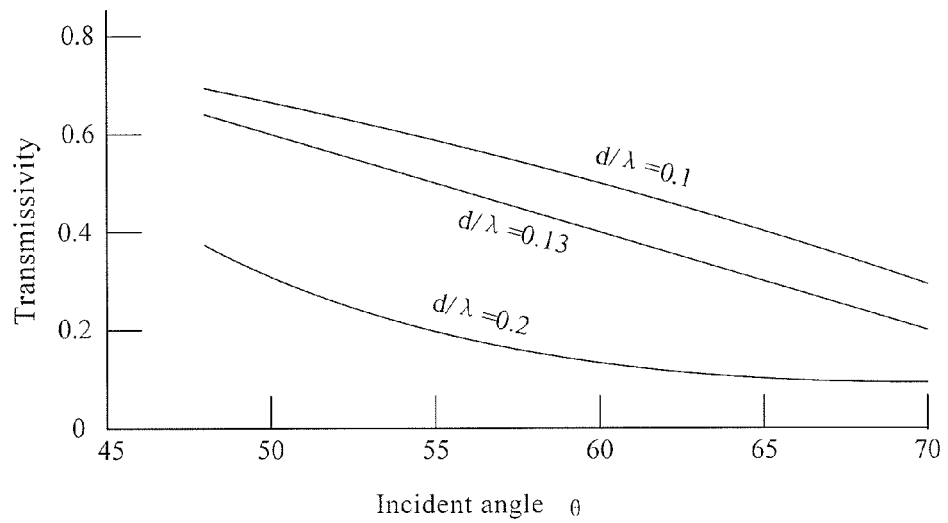
FIG. 2 is a graph showing dependence of transmissivity on medium interval d and incident angle θ in frustrated total internal reflection.

Frustrated total internal reflection (FTIR) is utilized in reproducing data from the data storage device of the embodiment. FIG. 1 is a schematic view showing the principle of frustrated total internal reflection. As shown in FIG. 1, when the incident angle of the light transmitted in the medium n0 is larger than the critical angle $θ_0$ of total reflection at the interface between the medium n0 and the medium n1 and a distance d between the medium n0 and the medium n2 is lower than the wavelength of the light in the medium n0, frustrated total internal reflection happens to the light transmitted in the medium n0 and thus the light can be transmitted through the medium n1 into the medium n2. FIG. 2 is a graph showing dependence of transmissivity on medium interval d and incident angle θ in frustrated total internal reflection. Referring to FIG. 2, transmissivity is a function of the incident angle and the medium interval. Under the condition that the influence of light diffusion and absorption is omitted, when the wavelength and incident angle of light is constant, the transmissivity gradually increases with reduction of the medium interval d. As can be seen from the above explained principle of frustrated total internal reflection, to read data from the data storage device, light can be irradiated to the data storage element; if the magnetized transparent ferromagnetic element is close to the light waveguide element in a data storage element and conditions for frustrated total internal reflection are established, light emitted from the light waveguide element can be transmitted through the magnetized transparent ferromagnetic element and the protective element and thus be detected by an optical sensor, thereby reading data "0" from the data storage element; if the magnetized transparent ferromagnetic element is far away from the light waveguide element in a data storage element and conditions for frustrated total internal reflection are not established while conditions for total internal reflection are established, light from the light waveguide element can not be transmitted into the data storage element and thus the optical sensor can not detect any light, thereby reading data "1" from the data storage element.

In the embodiment, an externally applied magnetic field is used to control position of the magnetized transparent ferromagnetic element in the data storage element such that information can be stored in binary format in the data storage device. By use of the frustrated total internal reflection, the light sensor can detect whether light from the light waveguide element is transmitted through the respective data storage elements so as to read the binary data stored in the respective data storage elements. Thus, data can be written to and read from the data storage device. Since the writing and reading is accomplished by physical means without any damage or degradation to the device, the writing and reading processes can be repeated unlimited times without any disadvantageous impact on the rewritability of the data storage device. Due to the optical total internal reflection, each element can have two distinct states, i.e., a blocking state and a transmitting state, and therefore data can be recognized accurately, the bit error rate (BER) is low and reliability of writing and reading is improved.

Figure 3:
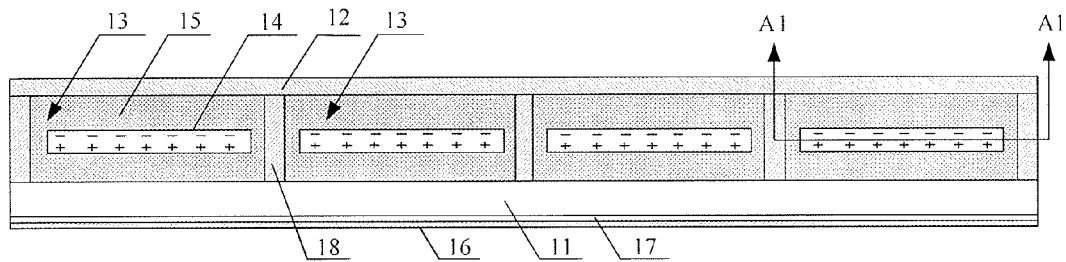
FIG. 3 is a schematic view showing structure of a data storage device according to a first embodiment of the present invention.

FIG. 3 is a schematic view showing structure of a data storage device according to a first embodiment of the present invention. As shown in FIG. 3, the data storage device according to the first embodiment comprises: a light waveguide element 11, a protective element 12 and a plurality of data storage elements 13 interposed between the light waveguide element 11 and the protective element 12. There are shown, for example, four data storage elements 13, and each data storage element 13 has therein a transparent ferromagnetic element 14 that has been previously magnetized. When the magnetized transparent ferromagnetic element 14 approaches the light waveguide element 11 by an externally applied magnetic field to allow light from the light waveguide element 11 to pass, a first data can be written to the data storage element 13; when the magnetized transparent ferromagnetic element 14 gets away from the light waveguide element 11 by an externally applied magnetic field to prohibit light from the light waveguide element 11 to pass, a second data is written to the data storage element 13. The recorded data can be read by irradiating light from the light waveguide element 11 through the light waveguide element towards the data storage element and the protective element and detecting whether the light is transmitted therethrough.

For those skilled in the art, the number of the data storage elements 13 can be adjusted as necessary.

In addition, light-blocking spacers 18 are disposed around the outer side of the data storage elements 13, contacting the light waveguide element 11 and the protective element 12. It is necessary that the light blocking spacers 18 are provided between two adjacent data storage elements 13. The light-blocking spacers 18 ensure that data can be stored in respective data storage elements without cross-talk between adjacent data storage elements. Semisolid polymer filler 15 may be disposed within the data storage elements 13. In the present embodiment, the data storage element 13 may further comprise a base sheet 16 to support the light waveguide element 11, and a reflecting layer 17 may be further coated on the surface of the base sheet 16 in the state of contacting with the light waveguide element 11. The base sheet 16 may act as a base physically supporting the data storage elements 13, and the reflecting layer 17 may prevent light from leaking from a lower side of the light waveguide element 11, thereby improving readability of the data storage elements 13.

Figure 4:
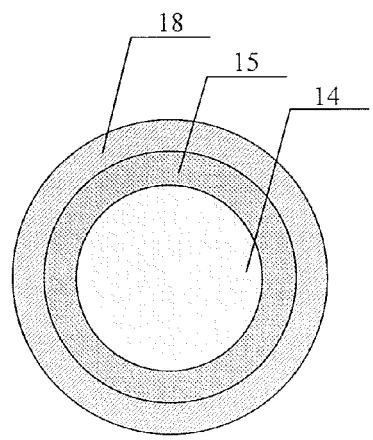
FIG. 4 is a sectional view taken along direction A1-A1 in FIG. 3.

FIG. 4 is a sectional view taken along direction A1-A1 in FIG. 3. As shown, the semisolid polymer filler 15 is filled within the data storage elements 13, and the light-blocking spacers 18 are disposed around the outer side of the data storage elements 13. The magnetized transparent ferromagnetic element 14 is embedded in the semisolid polymer filler 15. When external force is not applied to the magnetized transparent ferromagnetic element 14, the semisolid polymer filler 15 can hold the magnetized transparent ferromagnetic element 14 at its current position, i.e., data recording position. As shown in FIG. 4, the data storage elements 13 and the light-blocking spacer 18 each have a circular shape in the section view. Alternatively, the data storage elements 13 and the light-blocking spacers 18 each may have other sectional shape as desired.

Figure 5:
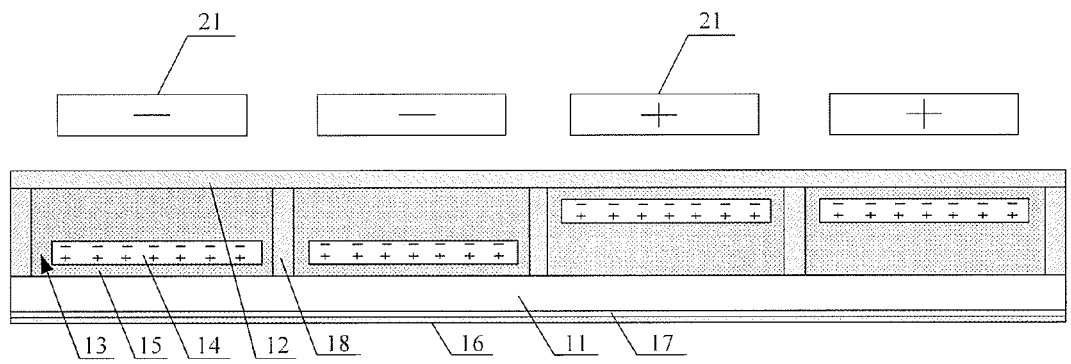
FIG. 5 is a schematic view showing principle of writing data into the data storage device according to the first embodiment of the present invention.

FIG. 5 is a schematic view showing writing data into the data storage device according to the first embodiment of the present invention. As shown, assuming that a side of the magnetized transparent ferromagnetic element 14 close to the light waveguide element 11 has positive magnetic charges and an opposite side of the magnetized transparent ferromagnetic element 14 close to the protective element 12 has negative magnetic charges. Such magnetized transparent ferromagnetic element 14 that has been magnetized can be obtained by a pretreatment process before disposition of the magnetized transparent ferromagnetic element 14 into the data storage element 13. Assuming further that when the magnetized transparent ferromagnetic element 14 in a data storage element 13 approaches the light waveguide element 11 by a magnetic field of negative polarity applied by a magnetic writer 21 disposed above the protective element 12 corresponding to the data storage element 13, a first data, e.g., a binary data "1", is recorded; when the magnetized transparent ferromagnetic element 14 in a data storage element 13 gets away from the light waveguide element 11 by a magnetic field of positive polarity applied by the magnetic writer 21 corresponding to the data storage element 13, a second data, e.g., a binary data "0" is recorded. Obviously, in stead the first data may be "0" while the second data may be "1". Assuming in the present embodiment that the first data is "1", and the second data is "0".

When writing data to four data storage elements 13 as shown in FIG. 5, four magnetic writers 21 may be disposed above the respective data storage elements 13 to apply a magnetic field thereto. If a binary data "1" needs to be written to one of the data storage elements 13 and the distance between the transparent ferromagnetic element 14 and the light waveguide element 11 is larger than the wavelength of light in the light waveguide element 11, the magnetic writer 21 may apply a magnetic field of negative polarity to the intended data storage element 13, and the magnetic field of negative polarity repels the upper side of the magnetized transparent ferromagnetic element 14 having negative magnetic charges such that the transparent ferromagnetic element 14 moves towards the light waveguide element 11. When the distance between the transparent ferromagnetic element 14 and the light waveguide element 11 becomes smaller than the wavelength of the incident light, the light can be transmitted from the light waveguide element 11 through the data storage element 13 and then the protective element 12. Thus, data "1" is recorded. If a binary data "0" needs to be written to one of the data storage elements 13 and the distance between the transparent ferromagnetic element 14 and the light waveguide element 11 is smaller than the wavelength of the incident light, the magnetic writer 21 may apply a magnetic field of positive polarity to the intended data storage element 13, and the magnetic field of positive polarity attracts the upper side of the magnetized transparent ferromagnetic element 14 having negative magnetic charges such that the transparent ferromagnetic element 14 moves upwards away from the light waveguide element 11. When the distance between the transparent ferromagnetic element 14 and the light waveguide element 11 becomes larger than the wavelength of the incident light, the light can not be transmitted from the light waveguide element 11 into the data storage element 13. That is, total internal reflection occurs and the light can not be transmitted through the data storage element 13. Thus, data "0" is recorded. As shown in FIG. 5, "1100' is recorded in the data storage device.

Figure 6:
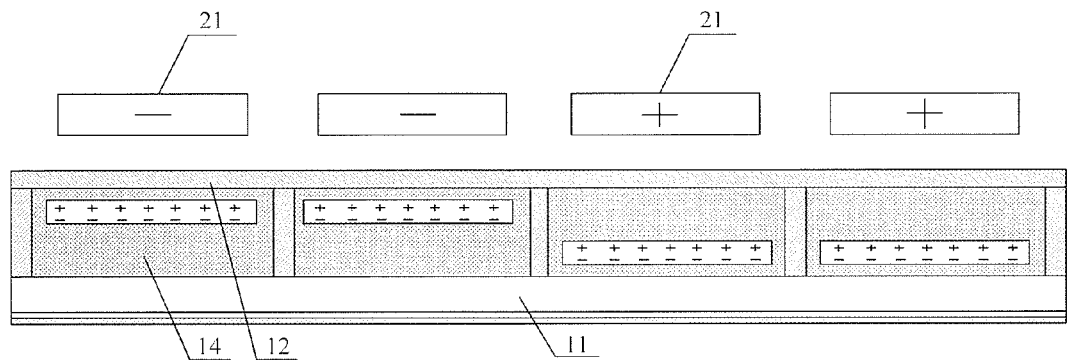
FIG. 6 is another schematic view showing principle of writing data into the data storage device according to the first embodiment of the present invention.

FIG. 6 is another schematic view showing writing data into the data storage device according to the first embodiment of the present invention. As shown, one side of the magnetized transparent ferromagnetic element 14 close to the light waveguide element 11 has negative magnetic charges, and an opposite side close to the protective element 12 has positive magnetic charges. Writing of data can be accomplished by adjusting polarity of the magnetic field from the magnetic writer 21, similar to that in the previous embodiment and details are omitted here.

Figure 7:
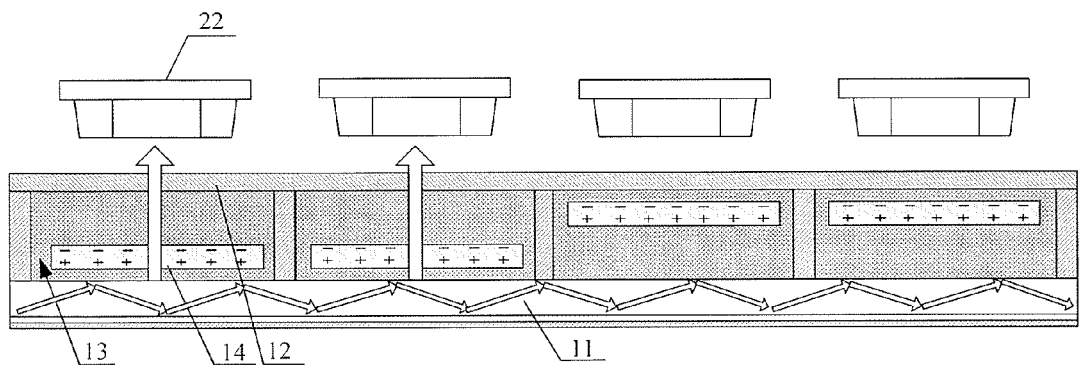
FIG. 7 is a schematic view showing principle of reading data from the data storage device according to the first embodiment of the present invention.

FIG. 7 is a schematic view showing reading data from the data storage device according to the first embodiment of the present invention. A shown, light is transmitted in the light waveguide element 11. When a distance between the magnetized transparent ferromagnetic element 14 in a data storage element 13 and the light waveguide element 11 is larger than wavelength of the light, total internal reflection occurs and a light sensor 22 disposed above the data storage element 13 can not detect any light transmitted through the upper surface of the protective element 12. Thus, the light sensor 22 reads data "0". When the distance between the magnetized transparent ferromagnetic element 14 in the data storage element 13 and the light waveguide element 11 is smaller than wavelength of the light, frustrated total internal reflection occurs and the light sensor 22 disposed above the data storage element 13 can detect light transmitted through the upper surface of the protective element 12. Thus, the light sensor 22 reads data "1". As shown in FIG. 7, data "1100" is read from the data storage device.

In the present embodiment, position of the magnetized transparent ferromagnetic element in the data storage element can be controlled by an externally applied magnetic field, and binary data may be written to the data storage device by adjusting polarity of the magnetic field. By use of frustrated total internal reflection, the light sensor can detect whether light from the light guiding element is transmitted through respective data storage elements so as to read the binary data stored in the respective data storage elements. Thus, data may be written to and read from the data storage device. Since the writing and reading is accomplished by physical means without any damage or degradation to the device, the writing and reading processes can be repeated unlimited times without any disadvantageous impact on rewritability of the data storage device. Due to the optical total internal reflection, light can have two distinct states, i.e., a blocking state and a transmitting state, and thus data can be recognized accurately, the bit error rate (BER) is low and reliability of writing and reading is improved.

Figure 8:
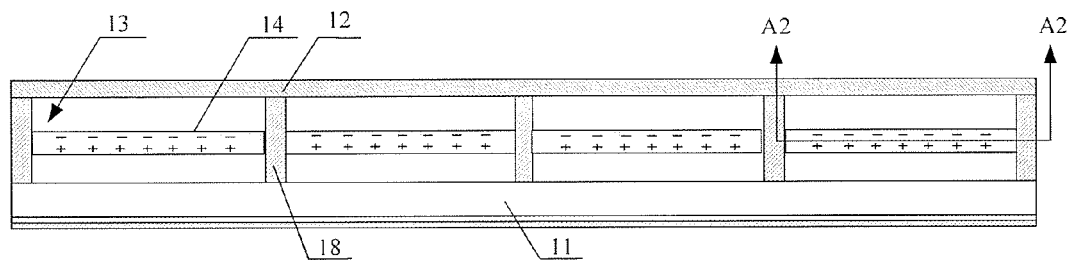
FIG. 8 is a schematic view showing structure of a data storage device according to a second embodiment of the present invention.
Figure 9:
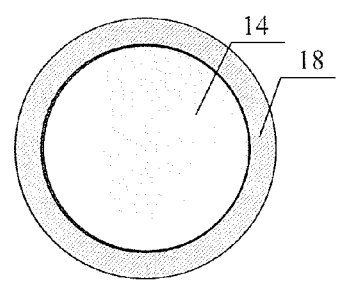
FIG. 9 is a sectional view taken along direction A2-A2 in FIG. 8.

FIG. 8 is a schematic view showing structure of a data storage device according to a second embodiment of the present invention. As shown, the present embodiment is different from the first embodiment in that the position of the magnetized transparent ferromagnetic element 14 is maintained. In the present embodiment, the light-blocking spacers 18 are disposed around the outer side of the data storage elements 13, contacting the light waveguide element 11 and the protective element 12. The light-blocking spacers 18 ensure that data is stored in respective data storage elements without cross-talk between adjacent data storage elements. The magnetized transparent ferromagnetic element 14 is in contact with and damply coupled to the light-blocking spacer 18. In this case, position of the magnetized transparent ferromagnetic element 14 is maintained by friction between the magnetized transparent ferromagnetic element 14 and the light-blocking spacer 18, without any semisolid polymer filler 15 filled in the data storage elements 13. FIG. 9 is a sectional view taken from direction A2-A2 in FIG. 8. As shown, the magnetized transparent ferromagnetic element 14 is in contact with and damply coupled to the light-blocking spacer 18 such that position thereof can be maintained when external force is not applied to the magnetized transparent ferromagnetic element 14, and thus the recorded data is maintained. In an embodiment, the magnetized transparent ferromagnetic element 14 and the light-blocking spacer 18 may be formed as a piston assembly to obtain the damping effect. The light-blocking spacers 18 ensure that data is stored within respective data storage elements without cross-talk between adjacent data storage elements. Writing and reading of the data storage device according to the present embodiment is substantially the same as that in the first embodiment, thus details are omitted.

A data storage apparatus according to an embodiment of the present invention may comprise: a data storage device, a light-emitting device, a light sensor and a magnetic writer. The data storage device comprises a light waveguide element, a protective element, and a plurality of data storage elements interposed between the light waveguide element and the protective element. A transparent ferromagnetic element that has been magnetized is disposed in each of the data storage elements. When the magnetized transparent ferromagnetic element in a data storage element approaches the light waveguide element by an externally applied magnetic field to allow light from the light guiding element to pass, a first data is written to the data storage element; when the magnetized transparent ferromagnetic element in a data storage element gets away from the light waveguide element by an externally applied magnetic field to prohibit light from the light guiding element to pass, a second data is written to the data storage element. The recorded data can be read by irradiating light from the light waveguide element towards the data storage element and the protective element and detecting whether the light is transmitted therethrough. The light-emitting device is provided to emit light towards the light waveguide element. The light sensor serves to read the first or second data recorded in the data storage device by detecting light transmitted through the protective element of the data storage device. The magnetic writer serves to apply a magnetic field to the magnetized transparent ferromagnetic element of a data storage element to move the magnetized transparent ferromagnetic element towards the light waveguide element to record a first data or away from the light waveguide element to record a second data.

The data storage device included in the data storage apparatus of the present invention may be a data storage device according to any one of previous embodiments, and therefore details thereof are omitted here.

In an embodiment, the data storage element is filled with semisolid polymer filler therein. Alternatively, light-blocking spacers 18 may be disposed around the outer side of the data storage elements 13, contacting the light waveguide element 11 and the protective element 12. The magnetized transparent ferromagnetic element 14 is in contact with and damply coupled to the light-blocking spacer 18.

In addition, the data storage apparatus may further comprise a base sheet for supporting the light waveguide element. On the surface of the base sheet facing the light waveguide element, a reflective layer may be coated.

In the present embodiment, the position of the magnetized transparent ferromagnetic element in the data storage element can be controlled by use of the magnetic writer, and binary data can be written to the data storage device by adjusting polarity of a magnetic field applied by the magnetic writer. By use of frustrated total internal reflection, the light sensor can read data recorded in the data storage device by detecting whether light from the light guiding element and eradiated by the light-emitting element is transmitted through respective data storage elements. Thus, data can be written to and read from the data storage device. Since the writing and reading is accomplished by physical means without any damage or degradation to the device, the writing and reading processes may be repeated unlimited times without any disadvantageous impact on rewritability of the data storage device. Due to the optical total internal reflection, light can have two distinct states, i.e., a blocking state and a transmitting state, and thus data can be recognized accurately, the bit error rate (BER) is low and reliability of writing and reading is improved.

A data storage method according to an embodiment of the present invention may comprise: adjusting a distance between a light waveguide element and a magnetized transparent ferromagnetic element in a data storage element by applying a magnetic field, such that total internal reflection or frustrated total internal reflection occurs for light transmitted in the light waveguide element. If frustrated total internal reflection occurs and a fraction of light is transmitted through the magnetized transparent ferromagnetic element, such state means a first data has been recorded in the data storage element; if total internal reflection occurs, such state means that a second data has been recorded in the data storage element.

Specifically, data recorded in the data storage device may comprise the binary digits "0" and "1", i.e., the first data and the second data. The magnetized transparent ferromagnetic element may be obtained by pretreatment of applying a magnetic field to a normal transparent ferromagnetic element such that one side of the transparent ferromagnetic element acts as a positive magnetic pole and the other side thereof acts as a negative magnetic pole. Thus, the distance between the transparent ferromagnetic element that has been magnetized and the light waveguide element can be changed by an external magnetic field. In each data storage element, the distance between the magnetized transparent ferromagnetic element and the light waveguide element can be controlled by adjusting the intensity of the external magnetic field so as to ensure that all of the magnetized transparent ferromagnetic elements representing a binary digit "0" are spaced apart from the light waveguide element by a same distance and all of the magnetized transparent ferromagnetic elements representing a binary digit "1" are also spaced apart from the light waveguide element by another same distance.

Assuming that the binary data "0" is recorded when the magnetized transparent ferromagnetic element is close to the light waveguide element to allow light to pass, and data "1" is recorded when the magnetized transparent ferromagnetic element is far away from the light waveguide element to prohibit light to pass. When writing data to the data storage device, the polarity of the magnetic field from the magnetic writer can be adjusted according to data to be recorded in respective data storage elements to control positions of the magnetized transparent ferromagnetic elements in the data storage elements and thus a distance between the magnetized transparent ferromagnetic element in each data storage element and the light waveguide element. As such, writing of data is completed.

In the present embodiment, the position of the magnetized transparent ferromagnetic element in the data storage element may be controlled by use of a magnetic field in order to record binary data in the data storage device. Since writing is accomplished by physical means without any damage or degradation to the device, the writing process may repeat unlimited times without any disadvantageous impact on rewritability of the data storage device. Due to the optical total internal reflection, light can have two distinct states, i.e., a blocking state and a transmitting state, and thus data can be recognized accurately, the bit error rate (BER) is low and reliability of writing and reading is improved.

A method for reading data from the data storage device according to the present invention may comprise: irradiating the light waveguide element by use of a light source; if frustrated total internal reflection occurs in a data storage element and light in the light waveguide element is transmitted through the magnetized transparent ferromagnetic element in the data storage element, a first data is read from the data storage element, and if total internal reflection occurs and light in the light waveguide element can not be transmitted through the magnetized transparent ferromagnetic element, a second data is read.

Specifically, the light waveguide element is irradiated by the external light source and light is transmitted in the light waveguide element. When the distance between the magnetized transparent ferromagnetic element in the data storage element and the light waveguide element is larger than wavelength of the light, total internal reflection occurs in the data storage element and the light sensor disposed above the data storage element can not detect any light transmitted through the upper surface of the protective element. At this point, the light sensor reads data "0", i.e., the second data. When the distance between the magnetized transparent ferromagnetic element in the data storage element and the light waveguide element is smaller than wavelength of the light, frustrated total internal reflection occurs in the data storage element and the light sensor disposed above the data storage element can detect light transmitted through the upper surface of the protective element. At this point, the light sensor reads data "1", i.e., the second data. By this way, data recorded in the data storage device may be read.

In the present embodiment, reading is accomplished by physical means without any damage or degradation to the device, and thus the reading process may repeat unlimited times without any disadvantageous impact on rewritability of the data storage device. Due to the optical total internal reflection, light can have two distinct states, i.e., a blocking state and a transmitting state, and thus data can be recognized accurately, the bit error rate (BER) is low and reliability of writing and reading is improved.

The invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A data storage device, comprising:
a light waveguide element;
a protective element; and
a plurality of data storage elements interposed between the light waveguide element and the protective element,
wherein the light waveguide element irradiates light at a critical angle or more on the data storage elements,
wherein each of the data storage elements comprises a transparent ferromagnetic element, which has been magnetized, disposed therein, and the magnetized transparent ferromagnetic element is movable by a magnetic field,
wherein when the magnetized transparent ferromagnetic element is moved close to the light waveguide element to allow light from the light guiding element to pass the data storage element, a first data is recorded, and when the magnetized transparent ferromagnetic element is moved away from the light waveguide element to prohibit light from the light guiding element to pass the data storage element, a second data is recorded.

2. The data storage device of claim 1, further comprising a light-blocking spacer disposed between two adjacent data storage elements, wherein the light-blocking spacer is in contact with the light waveguide element and the protective element.

3. The data storage device of claim 1, wherein the data storage element further comprises semisolid polymer filler disposed therein, and the magnetized transparent ferromagnetic element is embedded in the semisolid polymer filler.

4. The data storage device of claim 2, wherein the data storage element further comprises semisolid polymer filler disposed therein, and the magnetized transparent ferromagnetic element is embedded in the semisolid polymer filler.

5. The data storage device of claim 2, wherein the magnetized transparent ferromagnetic element is in contact with and damply coupled to the light-blocking spacer.

6. The data storage device of claim 1, further comprising a base sheet supporting the light waveguide element.

7. The data storage device of claim 6, wherein a surface of the base sheet facing the light waveguide element is coated with a reflective layer.

8. A data storage apparatus, comprising:
a data storage device, comprising:
a light waveguide element;
a protective element; and
a plurality of data storage elements interposed between the light waveguide element and the protective element, wherein the light waveguide element irradiates light at a critical angle or more on the data storage elements, wherein each of the data storage elements comprises a transparent ferromagnetic element, which has been magnetized, disposed therein, and the magnetized transparent ferromagnetic element is movable by a magnetic field, and wherein when the magnetized transparent ferromagnetic element is moved close to the light waveguide element to allow light from the light guiding element to pass the data storage element, a first data is recorded, and when the magnetized transparent ferromagnetic element is moved away from the light waveguide element to prohibit light from the light guiding element to pass the data storage element, a second data is recorded;
a light-emitting device emitting light towards the light waveguide element;
a light sensor reading the first data or the second data stored in the data storage device by detecting light transmitted through the data storage element; and
a magnetic writer applying the magnetic field to move the magnetized transparent ferromagnetic element to approach the light waveguide element to record the first data or get away from the light waveguide element to record the second data.

9. The data storage apparatus of claim 8, further comprising a light-blocking spacer disposed between two adjacent data storage elements, wherein the light-blocking spacer is in contact with the light waveguide element and the protective element.

10. The data storage apparatus of claim 8, wherein the data storage element further comprises semisolid polymer filler disposed therein, and the magnetized transparent ferromagnetic element is embedded in the semisolid polymer filler.

11. The data storage apparatus of claim 9, wherein the data storage element further comprises semisolid polymer filler disposed therein, and the magnetized transparent ferromagnetic element is embedded in the semisolid polymer filler.

12. The data storage apparatus of claim 9, wherein the magnetized transparent ferromagnetic element is in contact with and damply coupled to the light-blocking spacer.

13. The data storage apparatus of claim 9, further comprising a base sheet supporting the light waveguide element.

14. The data storage apparatus of claim 13, wherein surface of the base sheet facing the light waveguide element is coated with a reflective layer.

15. The data storage apparatus of claim 8, wherein each data storage element is provided with one light sensor and one magnetic writer.

16. A method for writing data, comprising:
applying a magnetic field to adjust a distance between a light waveguide element and a magnetized transparent ferromagnetic element in a data storage element such that total internal reflection or frustrated total internal reflection occurs in the data storage element for light transmitted from the light waveguide element, wherein the light waveguide element irradiate light at a critical angle or more on the data storage elements,
wherein when frustrated total internal reflection occurs and the light is transmitted through the magnetized transparent ferromagnetic element, a first data is written in the data storage element, and
wherein when total internal reflection occurs and the light is prohibited from being transmitted through the magnetized transparent ferromagnetic element, a second data is written in the data storage element.

17. The method of claim 16, wherein the data storage element further comprises semisolid polymer filler disposed therein, and the magnetized transparent ferromagnetic element is embedded in the semisolid polymer filler for keeping its position.

18. The method of claim 16, wherein the magnetized transparent ferromagnetic element is kept at its position by damping contact.

19. A method for reading data, comprising:
irradiating light at a critical angle or more on a data storage element via a light waveguide element from a light source, wherein the data storage element comprises a transparent ferromagnetic element, which has been magnetized, disposed therein,
wherein the magnetized transparent ferromagnetic element is positioned to allow frustrated total internal reflection or total internal reflection to occur in the data storage element for light from the light waveguide element, wherein when frustrated total internal reflection occurs in the data storage element and light from the light source is transmitted through a magnetized transparent ferromagnetic element and detected, a first data is read from the data storage element, and wherein when total internal reflection occurs in the data storage element and light is prohibited from the light source being transmitted through a magnetized transparent ferromagnetic element and detected, a second data is read from the data storage element.

* * * * *